(12) United States Patent
Mitchell

(10) Patent No.: US 6,754,844 B1
(45) Date of Patent: Jun. 22, 2004

(54) DIAGNOSTIC CONFIGURATION MANAGEMENT OF EMBEDDED NETWORK DEVICES

(75) Inventor: Bradley W. Mitchell, Eagle Mountain, UT (US)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 09/704,367

(22) Filed: Oct. 31, 2000

(51) Int. Cl.[7] .............................................. G06F 11/00
(52) U.S. Cl. .............................. 714/4; 714/25; 702/186
(58) Field of Search ............................... 714/4, 43, 25, 714/26; 709/220; 702/186

(56) References Cited

U.S. PATENT DOCUMENTS 6,085,335 A * 7/2000 Djoko et al. ................ 714/26
6,112,235 A * 8/2000 Spofford ..................... 709/223
6,175,934 B1 * 1/2001 Hershey et al. ............... 714/25
6,311,291 B1 * 10/2001 Barrett, Sr. .................. 714/25
6,330,597 B2 * 12/2001 Collin et al. ................ 709/220
6,374,352 B1 * 4/2002 Goldman et al. .............. 713/1
6,480,972 B1 * 11/2002 Cromer et al. ................ 714/25

* cited by examiner

Primary Examiner—Robert Beausoliel
Assistant Examiner—Marc Duncan
(74) Attorney, Agent, or Firm—Blakely, Sokoloff, Taylor & Zafman LLP

(57) ABSTRACT

Configuration of an embedded network device is described. The configuration technique described can is accomplished by a single process in order to provide a complete and consistent configuration. Various tests are performed including heuristic checks that check for common configuration errors. Other hardware and software tests are also performed. In one embodiment, the embedded network device includes an operating system kernel stored in memory and executed by a processor. During configuration, extensions to the operating system as well as application-level upgrades can be provided.

24 Claims, 10 Drawing Sheets

DIAGNOSTIC CONFIGURATION MANAGEMENT OF EMBEDDED NETWORK DEVICES

FIELD OF THE INVENTION

The invention relates to network devices. More particularly, the invention relates to network devices for information gathering, monitoring and intervention for use with remotely managed computer systems.

BACKGROUND OF THE INVENTION

Remote monitoring and management of computer systems is typically accomplished with combination of hardware and software available as separate packages or products. For example, one software application may configure network settings, another software application performs hardware diagnostic tests, and another application program may be used for other configuration purposes.

Because multiple applications are used overlapping tests may result in inconsistent or conflicting configuration parameters. Another possible consequence of multiple applications is that certain parameters may not be configured by any of the applications leaving a user confused as to why a component or system is not functioning properly. Other errors can also result from using multiple applications to configure a single component or system.

One technique for remote management of computer systems or other devices is to provide an embedded network device within a host system coupled to a network. The embedded network device has independent access to the network as well as internal access to the host system. The embedded network device can be used for remote management of the host system as well as for other purposes. Configuration of the embedded network device is generally more complicated than configuration of typical network devices. Therefore, the configuration shortcomings set forth above are exaggerated for these embedded network devices.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for Diagnostic Configuration Management of Embedded Network Devices are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Configuration of an embedded network device is described. The configuration technique described can is accomplished by a single process in order to provide a complete and consistent configuration. Various tests are performed including heuristic checks that check for common configuration errors. Other hardware and software tests are also performed. In one embodiment, the embedded network device includes an operating system kernel stored in memory and executed by a processor. During configuration, extensions to the operating system as well as application-level upgrades can be provided.

Figure 1:
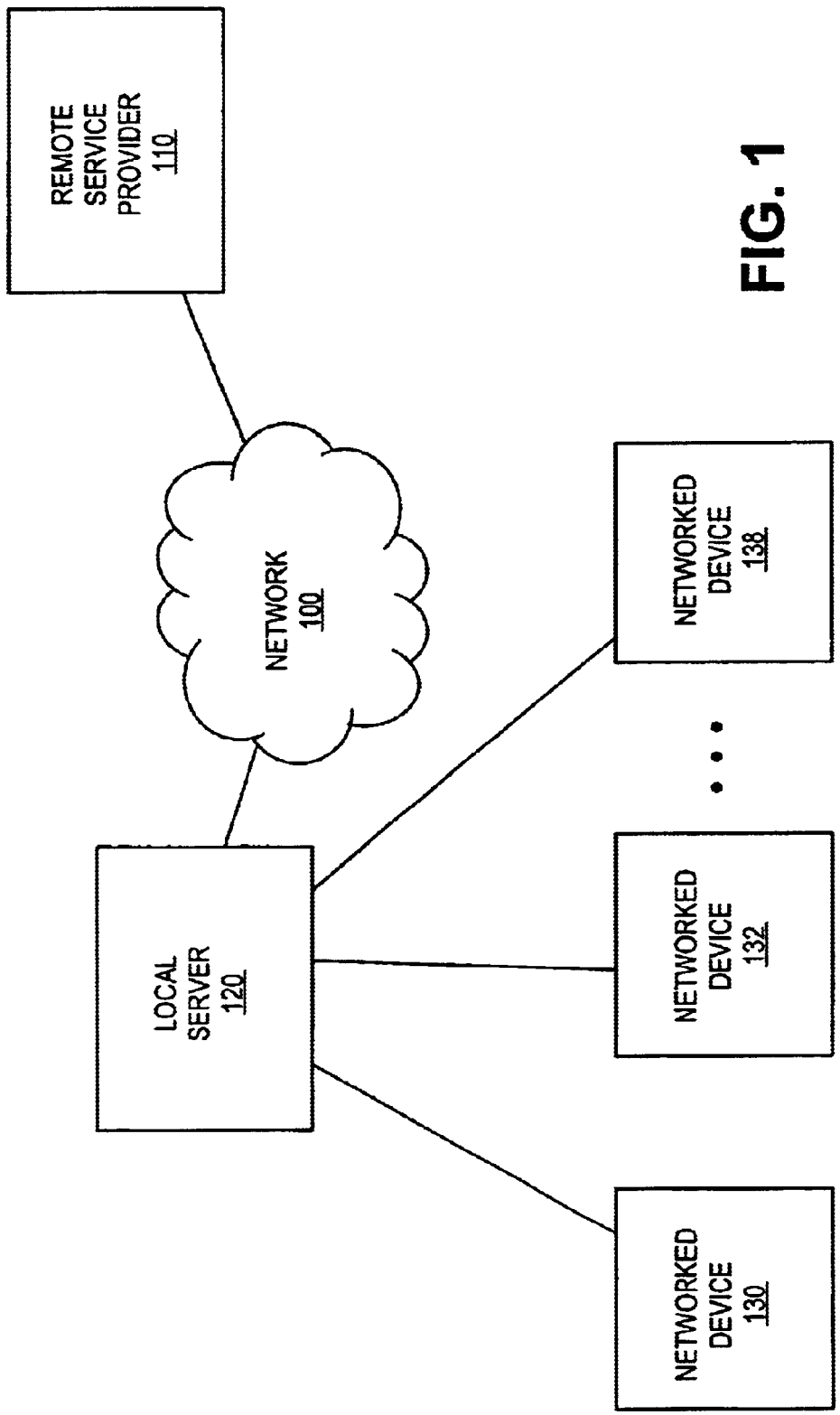
FIG. 1 is a block diagram of a remotely managed network of electronic systems.

FIG. 1 is a block diagram of a remotely managed network of electronic systems. FIG. 1 illustrates several basic components of a remotely managed network. Additional and/or different components can also be included in the network. For example, multiple remote service providers can be used to provide remote services from multiple individuals.

Network 100 provides an interconnection of electronic devices, for example, server computer systems, client computer systems, printers, copiers. Network 100 can include one or more of: a telephone network (plain old telephone system, or POTS), a virtual private network (VPN), a local area network (LAN), a wide area network (WAN), an integrated services digital network (ISDN) link, a digital subscriber line (DSL), or any other network medium. Any network protocol known in the art, for example, Transmission Control Protocol/Internet Protocol (TCP/IP).

Remote service provider 110 provides remote services to other electronic systems via network 100. In one embodiment, remote service provider 110 is a computer system having diagnostic and/or management software that allows a user of remote service provider 110 the ability to diagnose problems with or manage other electronic systems. In alternate embodiments, remote service provider is an electronic system other than a traditional computer system, for example, a set top box, a dedicated diagnostic/management device, a personal digital assistant having diagnostic or management software.

Local server 120 provides a bridge between remote service provider 110 and networked devices 130, 132 and 138 by receiving communicating data between remote service provider 110 and networked devices 130, 132 and 138 over network 100. In one embodiment, local server 120 is a computer system coupled to networked devices that are managed and/or diagnosed remotely. Local server 120 provides services and/or data for management and/or diagnostic purposes, but is not required to be a server of other types of files and/or applications.

Networked devices 130, 132 and 138 are intended to represent any number of a broad range of networkable electronic systems. Networked devices 130, 132 and 138 can be, for example, client computer systems, printers, personal digital assistants (PDAs), or any other electronic system that can be connected to a network.

In operation, remote service provider 110 has access to networked devices 130, 132 and 138 via network 100 and local server 120. For example, if networked device 130 were to unexpectedly crash, remote service provider can reboot networked device 130 or run diagnostic tests on networked device 130 to determine the cause of the crash. Other remote services can be provided in a similar manner.

Figure 2:
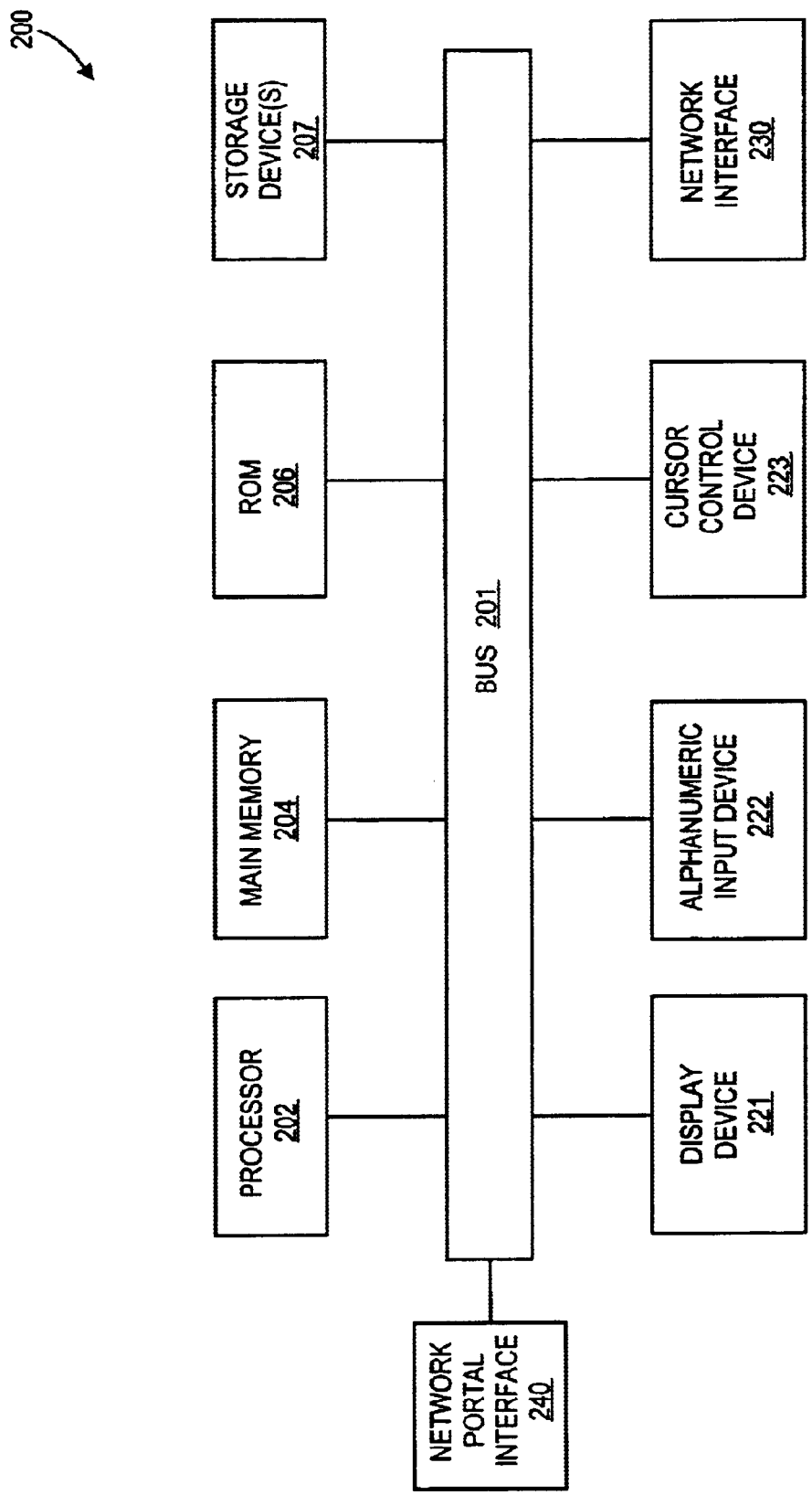
FIG. 2 is one embodiment of a computer system having a network portal interface.

FIG. 2 is one embodiment of a computer system having a network portal interface. The computer system illustrated in FIG. 2 is intended to represent a range of computer systems. Alternative computer systems can include more, fewer and/or different components.

Computer system 200 includes bus 201 or other communication device to communicate information, and processor 202 coupled to bus 201 to process information. While computer system 200 is illustrated with a single processor, computer system 200 can include multiple processors and/or co-processors. Computer system 200 further includes random access memory (RAM) or other dynamic storage device 204 (referred to as main memory), coupled to bus 201 to store information and instructions to be executed by processor 202. Main memory 204 also can be used to store temporary variables or other intermediate information during execution of instructions by processor 202.

Computer system 200 also includes read only memory (ROM) and/or other static storage device 206 coupled to bus 201 to store static information and instructions for processor 202. Data storage device 207 is coupled to bus 201 to store information and instructions. Data storage device 207 such as a magnetic disk or optical disc and corresponding drive can be coupled to computer system 200.

Computer system 200 can also be coupled via bus 201 to display device 221, such as a cathode ray tube (CRT) or liquid crystal display (LCD), to display information to a computer user. Alphanumeric input device 222, including alphanumeric and other keys, is typically coupled to bus 201 to communicate information and command selections to processor 202. Another type of user input device is cursor control 223, such as a mouse, a trackball, or cursor direction keys to communicate direction information and command selections to processor 202 and to control cursor movement on display 221.

Computer system 200 further includes network interface 230 to provide access to a network, such as a local area network. Network access can be provided in any manner known in the art. In one embodiment, network portal interface 240 is coupled to bus 201. In one embodiment, the first slot of the primary Peripheral Component Interconnect (PCI) bus is preferred. However, any slot of any bus can be used with the appropriate interfaces.

Instructions are provided to memory from a storage device, such as magnetic disk, a read-only memory (ROM) integrated circuit, CD-ROM, DVD, via a remote connection (e.g., over a network via network interface 230) that is either wired or wireless, etc. In alternative embodiments, hardwired circuitry can be used in place of or in combination with software instructions to implement the present invention. Thus, the present invention is not limited to any specific combination of hardware circuitry and software instructions.

A machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 3:
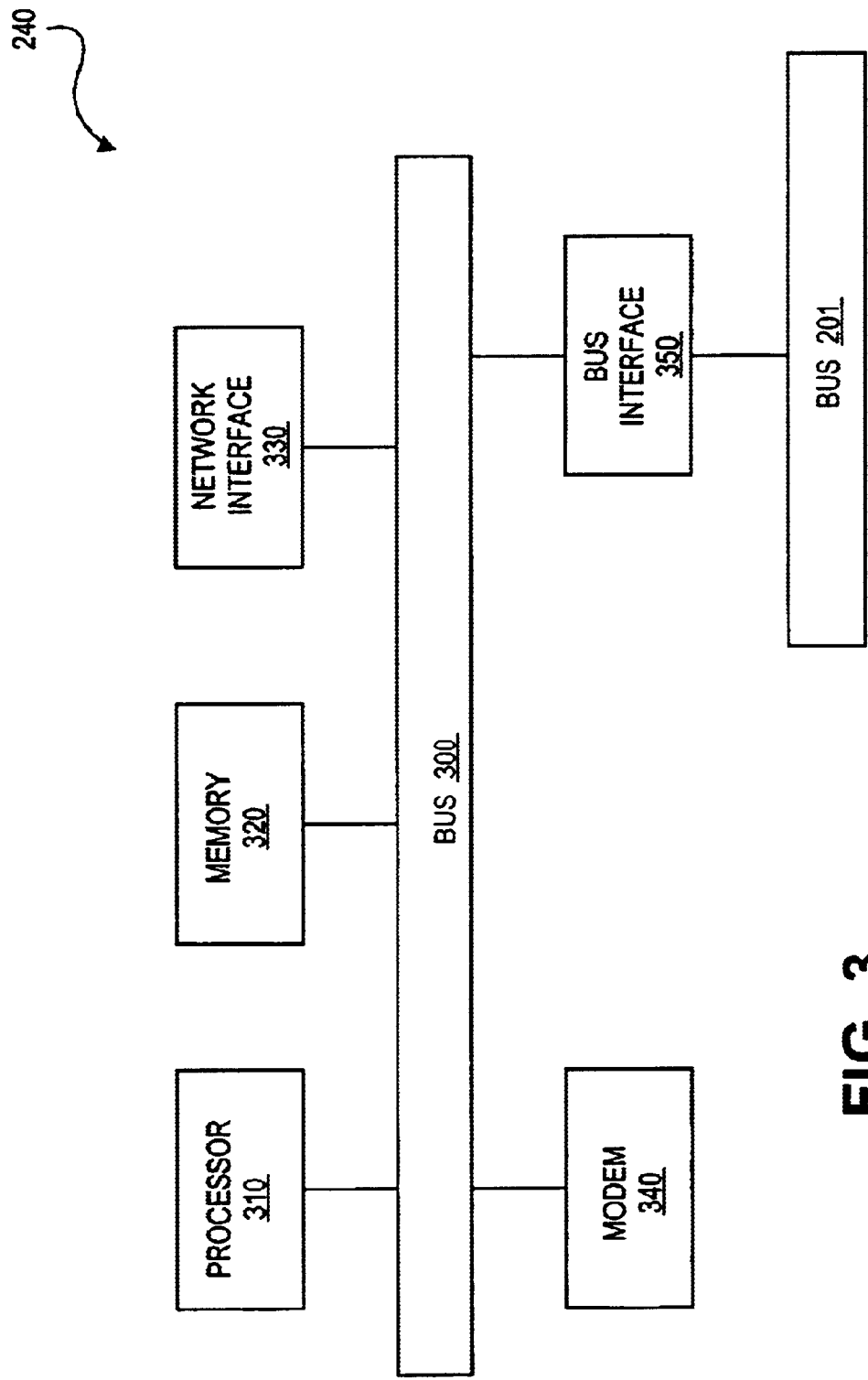
FIG. 3 is a block diagram of one embodiment of a network portal interface.

FIG. 3 is a block diagram of one embodiment of a network portal interface. In general, network portal interface 240 has the ability to operate independently of the electronic device (e.g., local server 120 of FIG. 1) in which it is located. This allows network portal interface 240 to be functional even if the associated electronic device is not functional.

Bus 300 provides an interconnection between the components of network portal interface 240. Bus 300 can be implemented in any appropriate manner known in the art (e.g., PCI bus, ISA bus, a non-standard bus). Processor 310 is coupled to bus 300 and executes instructions stored in memory 320, which is also coupled to bus 300. Memory 320 can include multiple types of memory (e.g., RAM, ROM, flash) In one embodiment, processor 310 is a 80386 processor available from Intel Corporation of Santa Clara, Calif.; however, any processor can be used. In one embodiment, memory 320 stores an operating system (e.g., VX Works, UNIX, Windows CE) that allows network portal interface 240 to operate independently of the host system.

Network portal interface 240 also includes network interface 330 that is coupled to bus 300. Network interface 330 provides network portal interface 240 with an independent connection to a network. This allows network portal interface 240 to communicate with a remote service provider or other device independent of the status of the host device of network portal interface 240.

In one embodiment, modem 340 is coupled to bus 300. Modem 340 provides access to a telephone or other communications line. Thus, for example, if network access is not available to network portal interface 240, processor 310 can send an alert via modem 340 to a system manager or other individual (e.g., via pager) to indicate the lack of network access. This would allow the network administrator to work on restoring network access.

Bus interface 350 provides an interface between bus 300 and bus 201 of the host system. This provides network portal interface 240 access to the host system. For example, if the host system has crashed, network portal interface 240 can communicate with a remote service provider to reboot or diagnose the host system. Because network portal interface 240 has an independent processor, operating system and network interface, network portal interface 240 is not reliant on the host system for functionality.

Figure 4:
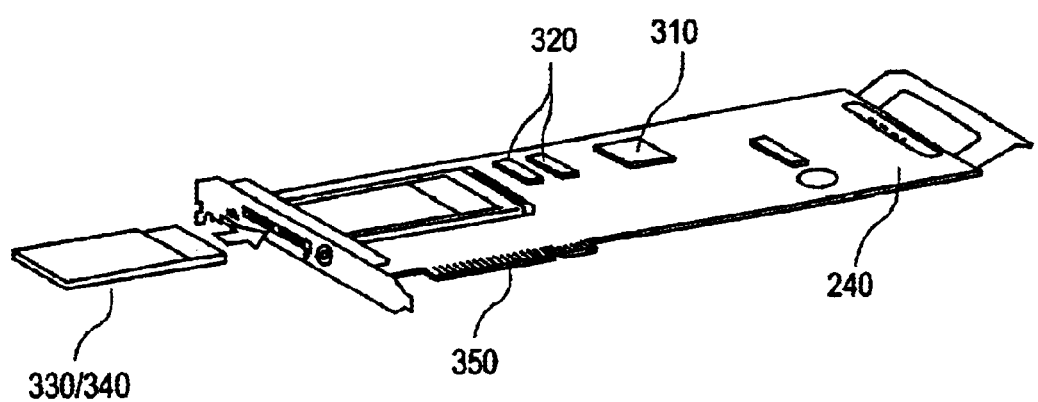
FIG. 4 illustrates one embodiment of a network portal interface implemented as a bus expansion card.

FIG. 4 illustrates one embodiment of a network portal interface implemented as a bus expansion card. In one embodiment, network portal interface 240 is a PCI bus expansion card; however, other implementations can also be provided. In one embodiment, network interface 330 and/or modem 340 are provided by a PCMCIA card inserted into a slot into network portal interface 240. In one embodiment, the PCMCIA card provides a 10/100 Ethernet interface and a 56 k modem. In alternate embodiments, other combinations of network and/or modem support can be provided.

Figure 5:
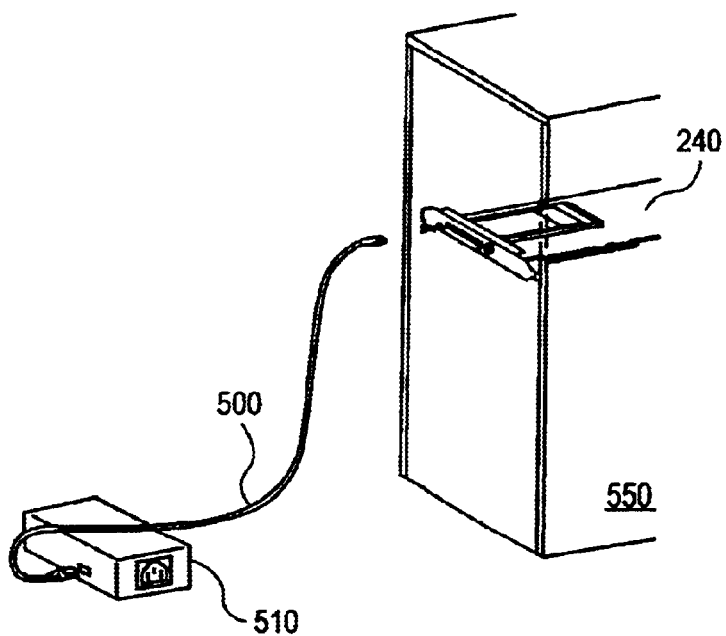
FIG. 5 illustrates a network portal interface having a power management interface and installed in a host system.

FIG. 5 illustrates a network portal interface having a power management interface and installed in a host system. In one embodiment, network portal interface 240 includes power management interface that is coupled to a power supply 510 via power control cable 500. Power control cable 500 allows network portal interface 240 to control the supply of power to host system 550. In one embodiment, power control cable 500 is a three line control bus; however, any configuration can be used.

Figure 6:
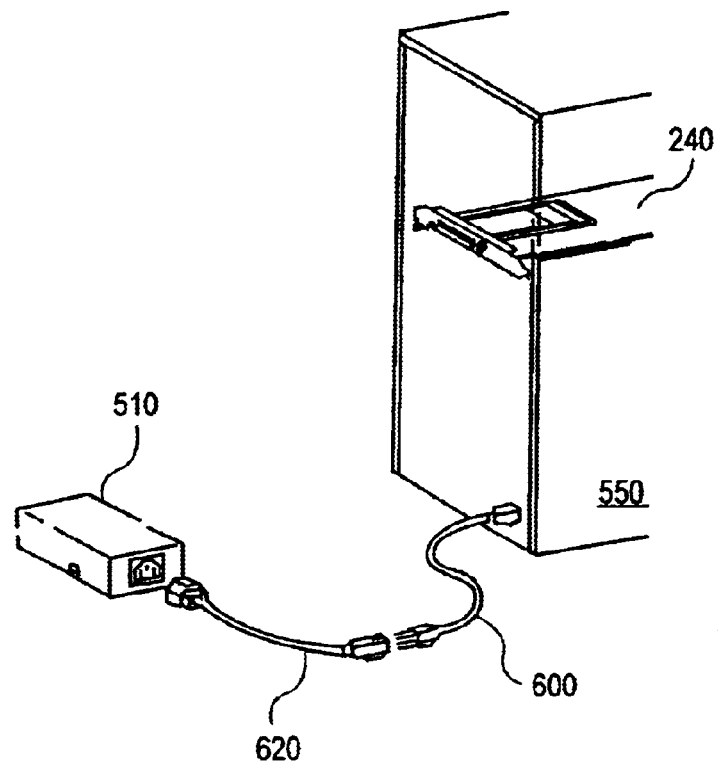
FIG. 6 illustrates a power supply connection between a power supply controlled by a network portal interface installed in a host system and the host system.

FIG. 6 illustrates a power supply connection between a power supply controlled by a network portal interface installed in a host system and the host system. For reasons of simplicity, the power control cable is not illustrated in FIG. 6. FIG. 6 illustrates two power cables between power supply 510 and host system 550; however, any number of power cables can be used.

Figure 7:
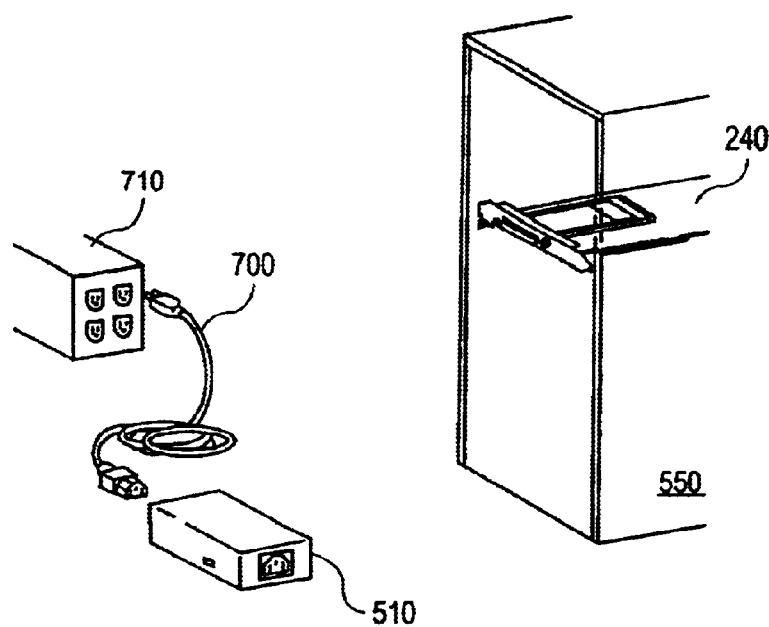
FIG. 7 illustrates a power supply connection between a power supply controlled by a network portal interface installed in a host system and a power source.

FIG. 7 illustrates a power supply connection between a power supply controlled by a network portal interface installed in a host system and a power source. For reasons of simplicity, the power control cable and the power supply lines are not illustrated in FIG. 7. Power supply 510 is coupled to AC power source 710 by power supply line 700. Power source 710 can be, for example, a surge protector, an uninterruptable power supply, or a wall outlet.

Figure 8:
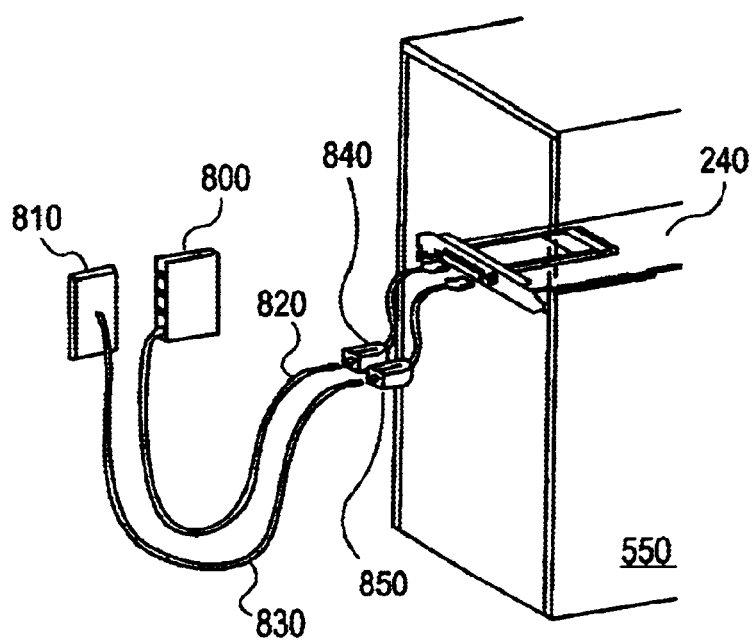
FIG. 8 illustrates network and phone line connections for a network portal interface installed in a host system.

FIG. 8 illustrates network and phone line connections for a network portal interface installed in a host system. Both network and phone line connections are illustrated; however, both connections are not necessary to allow network portal interface 240 to operate. Dongles 840 and 850 are coupled to the network port and the modem port, respectively, of network portal interface 240. Phone line 830 provides a connection to phone jack 810 for phone line access. Network cable 820 provides access to network jack 800 for network access.

Figure 9:
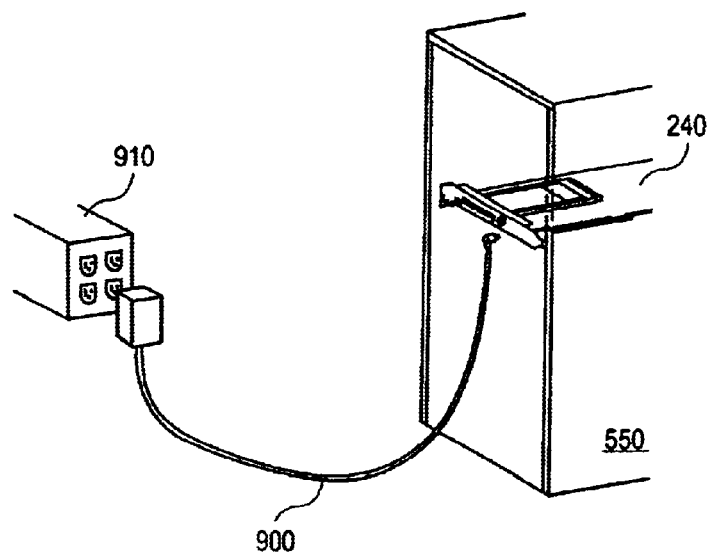
FIG. 9 illustrates a power supply connection between a power source and a network portal interface installed in a host system.

FIG. 9 illustrates a power supply connection between a power source and a network portal interface installed in a host system. Network portal interface 240 is coupled to power source 910 via power line 900. Power line 900 provides network portal interface 240 with a source of power that is independent of host system 550.

Figure 10:
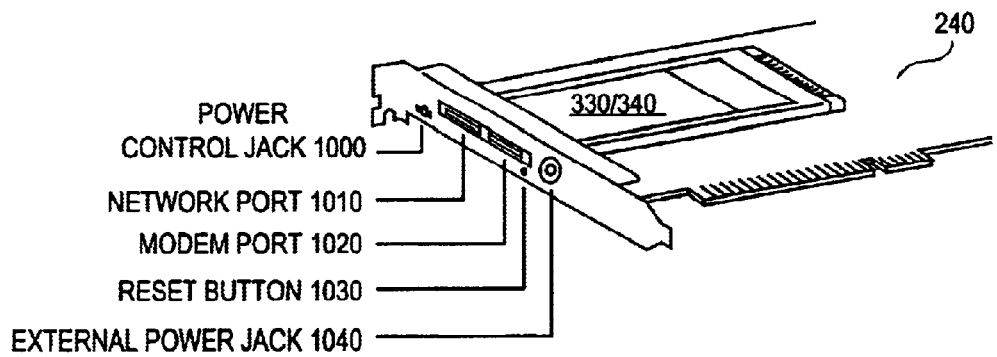
FIG. 10 illustrates one embodiment of a network portal interface face plate.

FIG. 10 illustrates one embodiment of a network portal interface face plate. In the embodiment, of FIG. 10, power control jack 1000 is provided to couple to a power control cable, network port 1010 is provided to couple to a network dongle, modem port 1020 is provide to couple to a modem dongle, reset button 1030 is provide to manually reset network portal interface 240, and external power jack 1040 is provided to receive power for network portal interface 240. Other face plates having different and/or additional interfaces can also be provided.

Figure 11:
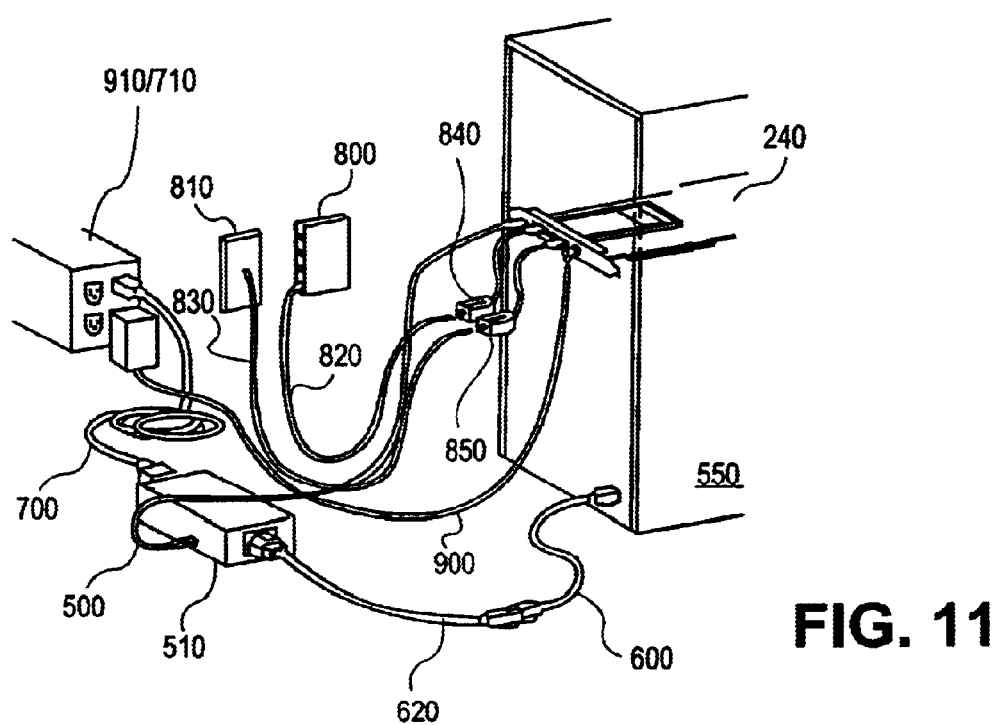
FIG. 11 illustrates the components of FIGS. 4–10 together to provide one embodiment of a network portal interface and associated supporting hardware.

FIG. 11 illustrates the components of FIGS. 4–10 together to provide one embodiment of a network portal interface and associated supporting hardware. In alternate embodiments, a different set of supporting hardware can be provided, for example, no modem to provide phone access.

Figure 12:
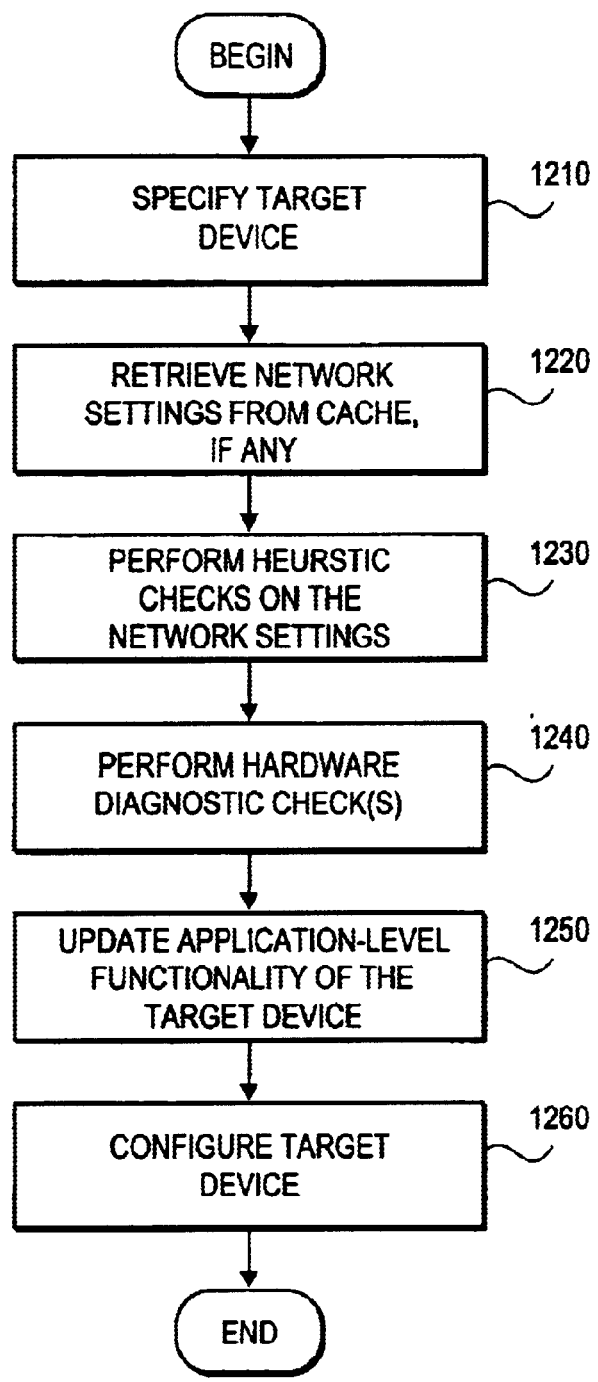
FIG. 12 is a flow chart of one embodiment of configuration management of an embedded network device.

FIG. 12 is a flow chart of one embodiment of configuration management of an embedded network device. The embedded network device (e.g., a network portal interface) is a network node. In one embodiment, the device features an operating system kernel and loadable application-level firmware modules. In one embodiment, optional IP addresses can be assigned to support out-of-band PPP/IP serial communications.

As described above the embedded network device is embedded within a host system. The embedded network device can be configured locally using the host system or remotely via a network connection.

A target device is specified at 1210. If the device is embedded in a remote host, the remote host is specified; otherwise the device is configured locally. The last known network settings for the device, if any, are retrieved from a cache maintained by the host system. In one embodiment, an operator can manually supply and/or modify the network settings. The host cache, and not the embedded device, is updated in this stage. If the embedded device supports dynamic self-configuration of network addresses, no additional changes occur at this stage. Otherwise the cached static address settings are validated. In one embodiment, address setting validation is accomplished by one or more of the following.

The syntax of the addresses and masks is verified. For example, configuration software can verify that the addresses are provided in the appropriate form (e.g., XXX.XXX.XXX.XXX). Similarly, the configuration software can verify that any network address masks take the appropriate form. In one embodiment, bits of the mask that are set must be to the left of bits of the mask that are clear. Other mask formats can also be used. If incorrect syntax is used an error message is generated indicating a syntax error.

The device addresses are checked to determine whether unavailable addresses are used. For example, certain address ranges are used for IP loopback (e.g., 127.0.0.1) or for multicasting addresses (e.g., 224.0.0.0 to 239.255.255.255). If an unavailable address is used by the device an error message is generated indicating use of unavailable addresses.

The bit arrangement of network masks is verified to determine whether a valid mask is provided. In one embodiment, the bits that make up the mask are checked for appropriate grouping. For example, the masks are checked against the classes of the various addresses to verify that the masks are correct.

The network mask is applied to the primary device address to verify that the masked address is valid. The presence of a network gateway address is verified in situations where network gateways are required. The device addresses are checked to verify that the addresses are unique with respect to each other an not in use elsewhere in the local network.

One or more heuristic checks are made at 1220. In one embodiment, the checks are made against the cached address settings to diagnose common conditions that can be fatal to the configuration management process. In one embodiment, one or more of the following checks are performed.

The class of network mask to be used with the device is checked to determine whether the mask matches the class of the primary device address. Optional device addresses are similarly verified. In one embodiment, configuration software verifies that the host system can be contacted via the network connection.

Hardware diagnostic checks are performed at 1140. In one embodiment, the hardware tests verify the integrity of the hardware components that must be functioning in order for the embedded device to support external configuration management. If any of the tests fail a hardware error message is generated. In one embodiment, the configuration software verifies that the embedded device hardware is recognized by the host and network connectivity between the host system and the primary device address. Other hardware checks can also be performed.

Application-level functionality of the embedded device is installed or upgraded at 1150. In one embodiment, the embedded device possesses a local file system accessible via an FTP connection, where application modules for the device reside in the form of binary files. In one embodiment, the operating system functionality of the embedded device is upgraded by the configuration software. In one embodiment, the embedded device possesses built in bootstrap capability for accepting a new operating system image via a network connection.

In one embodiment the following diagnostic checks are run after the applications and/or operating system are upgraded. The configuration software verifies that all application modules were successfully initialized For devices that have a modem, the configuration software verifies that the modem can reach a dial tone. For devices that are externally powered, verify that the operating voltage is within acceptable limits. For devices that depend on the host system for video support or other functionality, verify that the support components are available to the embedded device.

In one embodiment, if any of the above six tests fails configuration is halted until the necessary changes are made to the address information. In alternate embodiments, a different set of address tests can be performed or attempts at automatic correction can be made.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of diagnostic configuration management of an embedded network device, the method comprising:
    specifying a target embedded device within a remote host, the target embedded device capable of operating independently of the remote host;
    retrieving, from a cache maintained by the remote host, network settings for the embedded network device, if any;
    performing one or more heuristic checks on the network settings;
    performing one or more hardware diagnostic tests;
    providing application-level functionality to the embedded network device; and
    providing embedded network device configuration.

2. The method of claim 1 wherein retrieving, from a cache maintained by the remote host, network settings for the embedded network device, if any, comprises one or more of:
    verifying syntax of network addresses and masks;
    verifying that device addresses are not reserved for other purposes;
    verifying bit arrangement of network masks;
    applying the network mask to a primary device address to verify validity;
    verifying presence of a network gateway address; and
    verifying that network addresses are unique with respect to each other.

3. The method of claim 1 wherein performing one or more heuristic checks on the network settings comprises one or more of:
    verifying that a network mask class matches a primary device address;
    identifying optional device addresses; and
    verifying that the remote host is communicatively coupled to the a network.

4. The method of claim 1 wherein performing one or more hardware diagnostic tests comprises one or more of:
    verifying the embedded device hardware is recognized by the remote host; and
    verifying network connectivity between the remote host and a primary device address.

5. The method of claim 1 wherein providing application-level functionality to the embedded network device comprises providing application-level machine-readable code to the embedded network device.

6. The method of claim 5 wherein the application-level machine-readable code comprises an operating system.

7. The method of claim 1 wherein providing embedded network device configuration comprises one or more of:
    verifying that application-level machine-readable code modules are initialized;
    verifying that a built-in modem, if any, can access a line with a dial tone;
    verifying that external power lines, if any, provide a voltage within a predetermined operating range; and
    verifying that the embedded network device can access video resources of the host device.

8. The method of claim 1 further comprising transmitting from the embedded target device to a power supply external to the host device a control command.

9. A machine-readable medium having stored thereon sequences of instructions to cause diagnostic configuration management of an embedded network device, the sequences of instructions, when executed, cause one or more electronic systems to:
    specify a target embedded device within a remote host, the target embedded device capable of operating independently of the remote host;
    retrieve, from a cache maintained by the remote host, network settings for the embedded network device, if any;
    perform one or more heuristic checks on the network settings;
    perform one or more hardware diagnostic tests;
    provide application-level functionality to the embedded network device; and
    provide embedded network device configuration.

10. The machine-readable medium of claim 9 wherein the sequences of instructions that cause the one or more electronic systems to retrieve, from a cache maintained by the remote host, network settings for the embedded network device, if any, comprises sequences of instructions that, when executed, cause the one or more electronic system to cause one or more of:
    verifying syntax of network addresses and masks;
    verifying that device addresses are not reserved for other purposes;
    verifying bit arrangement of network masks;
    applying the network mask to a primary device address to verify validity;
    verifying presence of a network gateway address; and
    verifying that network addresses are unique with respect to each other.

11. The machine-readable medium of claim 9 wherein the sequences of instructions that cause the one or more electronic systems to perform one or more heuristic checks on the network settings comprises sequences of instructions that, when executed, cause the one or more electronic systems to cause one or more of:

verifying that a network mask class matches a primary device address;

identifying optional device addresses; and verifying that the remote host is communicatively coupled to the a network.

12. The machine-readable medium of claim 9 wherein the sequences of instructions that cause the one or more electronic systems to perform one or more hardware diagnostic tests comprises sequences of instructions that, when executed, cause the one or more electronic systems to cause one or more of:

verifying the embedded device hardware is recognized by the remote host; and verifying network connectivity between the remote host and a primary device address.

13. The machine-readable medium of claim 9 wherein providing application-level functionality to the embedded network device comprises providing application-level machine-readable code to the embedded network device.

14. The machine-readable medium of claim 13 wherein the application-level machine-readable code comprises an operating system.

15. The machine-readable medium of claim 9 wherein providing embedded network device configuration comprises one or more of:

verifying that application-level machine-readable code modules are initialized;

verifying that a built-in modem, if any, can access a line with a dial tone;

verifying that external power lines, if any, provide a voltage within a predetermined operating range; and verifying that the embedded network device can access video resources of the host device.

16. The machine-readable medium of claim 9 further comprising instructions that, when executed, cause the one or more electronic systems to transmit from the embedded target device to a power supply external to the host device a control command.

17. A computer data signal embodied in a data communications medium shared among a plurality of network devices comprising sequences of instructions to cause diagnostic configuration management of an embedded network device, the sequences of instructions, when executed, cause one or more electronic systems to:

specify a target embedded device within a remote host, the target embedded device capable of operating independently of the remote host;

retrieve, from a cache maintained by the remote host, network settings for the embedded network device, if any;

perform one or more heuristic checks on the network settings;

perform one or more hardware diagnostic tests;

provide application-level functionality to the embedded network device; and provide embedded network device configuration.

18. The computer data signal of claim 17 wherein the sequences of instructions that cause the one or more electronic systems to retrieve, from a cache maintained by the remote host, network settings for the embedded network device, if any, comprises sequences of instructions that, when executed, cause the one or more electronic system to cause one or more of:

verifying syntax of network addresses and masks;

verifying that device addresses are not reserved for other purposes;

verifying bit arrangement of network masks;

applying the network mask to a primary device address to verify validity;

verifying presence of a network gateway address; and verifying that network addresses are unique with respect to each other.

19. The computer data signal of claim 17 wherein the sequences of instructions that cause the one or more electronic systems to perform one or more heuristic checks on the network settings comprises sequences of instructions that, when executed, cause the one or more electronic systems to cause one or more of:

verifying that a network mask class matches a primary device address;

identifying optional device addresses; and verifying that the remote host is communicatively coupled to the a network.

20. The computer data signal of claim 17 wherein the sequences of instructions that cause the one or more electronic systems to perform one or more hardware diagnostic tests comprises sequences of instructions that, when executed, cause the one or more electronic systems to cause one or more of:

verifying the embedded device hardware is recognized by the remote host; and verifying network connectivity between the remote host and a primary device address.

21. The computer data signal of claim 17 wherein providing application-level functionality to the embedded network device comprises providing application-level machine-readable code to the embedded network device.

22. The computer data signal of claim 21 wherein the application-level machine-readable code comprises an operating system.

23. The computer data signal of claim 17 wherein providing embedded network device configuration comprises one or more of:

verifying that application-level machine-readable code modules are initialized;

verifying that a built-in modem, if any, can access a line with a dial tone;

verifying that external power lines, if any, provide a voltage within a predetermined operating range; and verifying that the embedded network device can access video resources of the host device.

24. The computer data signal of claim 17 further comprising instructions that, when executed, cause the one or more electronic systems to transmit from the embedded target device to a power supply external to the host device a control command.

* * * * *